(12) United States Patent
Mickle et al.

(10) Patent No.: US 7,084,605 B2
(45) Date of Patent: Aug. 1, 2006

(54) ENERGY HARVESTING CIRCUIT

(75) Inventors: Marlin H. Mickle, Pittsburgh, PA (US);
Christopher C. Capelli, Pittsburgh, PA (US); Harold Swift, Gibsonia, PA (US)

(73) Assignee: University of Pittsburgh, Pittsburgh, PA (US)

( * ) Notice: Subject to any disclaimer, the term of this patent is extended or adjusted under 35 U.S.C. 154(b) by 0 days.

(21) Appl. No.: 10/967,833

(22) Filed: Oct. 18, 2004

(65) Prior Publication Data

US 2005/0104553 A1     May 19, 2005

Related U.S. Application Data

(60) Provisional application No. 60/515,393, filed on Oct. 29, 2003.

(51) Int. Cl.
*H01M 10/44* (2006.01)
*H01Q 1/26* (2006.01)

(52) U.S. Cl. .................. 320/101; 320/104; 320/108; 343/701; 343/703

(58) Field of Classification Search ............ 320/101, 320/104, 108, 109; 343/850, 703, 701, 722, 343/741, 860
See application file for complete search history.

(56) References Cited

U.S. PATENT DOCUMENTS

| 4,724,427 | A | | 2/1988 | Carroll |
| 4,857,893 | A | | 8/1989 | Carroll |
| 5,296,866 | A | | 3/1994 | Sutton |
| 6,127,799 | A | * | 10/2000 | Krishnan .................. 320/104 |
| 6,289,237 | B1 | | 9/2001 | Mickle et al. |
| 6,373,447 | B1 | | 4/2002 | Rostoker et al. |
| 6,615,074 | B1 | | 9/2003 | Mickle et al. |

* cited by examiner

*Primary Examiner*—Tho Phan
*Assistant Examiner*—Chuc Tran
(74) *Attorney, Agent, or Firm*—Philip E. Levy; Arnold B. Silverman; Eckert Seamans Cherin & Mellott, LLC (57) ABSTRACT

A station having a means for receipt of ambient energy from the environment and energizing power storage devices of objects of interest comprising one or more antennae and circuitry for converting said ambient energy into DC power for energizing said power storage devices. The circuitry for converting the ambient energy into DC power may include a rectifier/charge pump. The antenna of the station is tuned to maximize DC energy at the output of the rectifier/charge pump. The station can be used to energize power storage devices including capacitors and batteries that are used in electronic devices, such as cell phones, cameras, PDAs. Various antenna constructions may be employed.

24 Claims, 7 Drawing Sheets

695 MHz and 755 MHz Both On

FIG. 4(a)

755 MHz On – 694 MHz Off

FIG. 4(b)

755 MHz and 695 MHz Both On

FIG. 4(c)

695 MHz On – 755 MHz Off

ENERGY HARVESTING CIRCUIT

CROSS-REFERENCE

This application claims the benefit of U.S. Provisional Application Ser. No. 60/515,393 entitled "ENERGY HARVESTING CIRCUIT" filed Oct. 29, 2003.

BACKGROUND OF THE INVENTION

1. Field of the Invention

The harvesting of Radio Frequency (RF) energy is extremely important for Radio Frequency Identification (RFID), security monitoring and remote sensing. Numerous uses such as some harvesting devices may be tuned to a specific frequency (RFID), while others take advantage of the ambient energy (remote sensing) and others simply sense frequencies for security purposes.

2. Description of the Prior Art

Recharging devices using an RF electromagnetic field radiated into free space have been described. U.S. Pat. No. 6,127,799 entitled, "Method and Apparatus for Wireless Powering and Recharging". This patent discloses a battery charging arrangement in which a rechargeable charge storage device is placed in an RF or microwave radiation field. In one aspect of the invention, a charge storage device is charged by exposing the charge storage device to an RF electromagnetic field radiated into free space. The charge storage device includes one or more antennae disposed on the device and adapted to receive the radiated RF electromagnetic field. One or more rectifiers are connected to the antennae for rectifying the received RF electromagnetic field into a DC output current. The DC output current produced by the rectifier is used to charge the charge storage device.

The antenna may be one or more dipole antennae which may be combined to form at least two subsets of dipole antenna element arrays, wherein one subset may be oriented at an acute or a right angle with respect to at least one other subset. The antennae or dipole antennae may be placed on more than one outside surface of the charge storage device which enclose an acute or a right angle with respect to each other. To efficiently couple the antenna array to the radiation field, each of the antenna elements of the array preferably has a length of approximately $\lambda/2$, wherein $\lambda$ is the free space wavelength of the RF radiation. If more than one dipole is used, the spacing between adjacent antenna dipoles is preferably also $\lambda/2$. The number of dipoles determines the power conversion efficiency of the antenna array.

Resonant antennae such as dipole antennae are more efficient for a given length of wire, but are restricted to narrow bandwidths. Most present day users of antennae for communication purposes desire an antenna that can operate on multiple frequencies without requiring antenna tuning or matching devices. U.S. Pat. No. 5,111,213 entitled, "Broadband Antenna" discloses a broadband HF antenna in which the entire length (height) of the antenna radiates radio frequency energy. The insertion resistor is introduced at the top of the antenna or on the inside surface of the antenna radiating element. The radio frequency antenna current travels through the insertion resistor and continues for an appreciable electrical distance in a coaxial cable and/or other passive components. Thus, the invention provides greater usable electrical radiating element length for a given physical antenna length (height).

U.S. patent application Ser. No. 10/624,051 by Mickle et al entitled, "Energy Harvesting Circuits and Associated Methods" discloses an energy harvesting circuit that has an inherently tuned antenna, with at least portions of the energy harvesting circuit structured to provide regenerative feedback into the antenna to thereby establish an effective antenna area substantially greater than the physical area.

A problem with the prior art is that the energy harvesting circuits cannot efficiently harvest RF energy at frequencies outside the design specific frequency of the antenna. For example, in U.S. Pat. No. 6,127,799, the disclosed dipoles that make up the antenna array are fixed to absorb RF energy at a specific frequency range. The purpose of the array is to increase the efficiency of the power conversion and not to increase the bandwidth of the RF energy to be absorbed.

However, the antenna for efficient energy harvesting requires characteristics that are different from those of a communications antenna.

What is needed is antenna and forms of the antenna(e) that are specifically designed for energy harvesting so as to maximize the harvesting of RF energy.

There is a need for energy harvesting circuits that can harvest RF energy from a broad RF spectrum so as to maximize the harvesting of RF energy.

Also, there is a need for energy harvesting circuits that can harvest RF energy from a broad RF spectrum by having an antenna that can be broadly tuned to broadcast frequencies (or other ambient frequencies) so as to maximize the harvesting of RF energy.

SUMMARY OF THE INVENTION

The present invention has met the above-described needs.

As employed herein, the term "object of interest" means any animate or inanimate item having an energizing power storage device or operatively associated with an energizing power storage device.

In one embodiment of the invention, an energy harvesting circuit for receipt of ambient energy from the environment and energizing power storage devices of objects of interest has one or more antennae and circuitry for converting said ambient energy into DC power for energizing said power storage devices. The circuitry for converting said ambient energy into DC power includes a rectifier/charge pump. The antenna of said station is tuned to maximize the DC energy at the output of the rectifier/charge pump.

This energy harvesting circuit would provide mobile power storage devices with a means to select the ambient RF that can provide the maximum amount of energy for harvesting. This energy harvesting circuit can be used to energize power storage devices including capacitors and batteries, for example, that are used in electronic devices such as cell phones, cameras, and PDAs. Maximizing energy harvesting using a broadband antenna would enable a device with power storage devices to move from location to location without manual tuning of the circuit.

The circuit in one embodiment may be formed as a stand-alone unit and, in another embodiment, may be formed on an integrated circuit.

The circuit may can be an antenna array consisting of multiple broadband antennae each tuned to a different portion of the frequency spectrum in order to harvest RF energy from a broad RF spectrum.

Additionally, the circuit can be an antenna array consisting of multiple broadband antennae in the same space each tuned to a specific portion of the frequency spectrum in order to maximize the harvest of RF energy from a given RF spectrum with multiple antennae in the same physical space.

Additionally, the circuit can include an RF combiner or balun to combine the input signals from two or more antennae directed to the rectifying circuit.

The antenna(e) may take the form of a conductive coil or patch, for example, on a planar substrate or may be a stand-alone component The invention will be more fully understood from the following description of the invention with reference to the drawings appended to this application.

BRIEF DESCRIPTION OF THE DRAWINGS

FIGS. 4(*a*)–4(*f*) are a series of pictures illustrating the operation of spiral antennae within the same physical space.

DESCRIPTION OF THE PREFERRED EMBODIMENTS

The initial sensing or sourcing of radio frequency (RF) energy begins with the energy harvesting antenna. An antenna may take many forms, but an antenna should be carefully designed in order to give the optimum performance in communications (AM and FM radio, Television, WiFi, for example). The antenna for efficient energy harvesting may have characteristics that are different from those of a communications antenna.

In energy harvesting, there is no need to discriminate against certain frequencies to receive the proper information. Thus, the sole criterion is to maximize the energy output of the antenna or the antenna/rectifier combination in a system that produces DC energy from the harvested RF energy. An optimum antenna in this sense is an antenna that produces the maximum DC energy at the output of the rectifier/charge pump. There are several categories of antennae in the context of this disclosure. While a single conductor may be a classically tuned or optimized antenna, the energy harvesting antenna will include certain elements that enhance the harvesting (collecting) of the RF energy to be supplied to the rectifier.

At any given time, numerous frequencies may be present where the energy of various frequencies may combine to form some unrecognizable signal that is noise to a communications system while being especially attractive to the input diode of a rectifier/charge pump that is simply rectifying the composite signal.

This is in fact the case with the classical AM modulated carrier. Spectrum-wise, there are at least two frequencies present where one is detected and the other is ignored—filtered out of the signal. In energy harvesting, the entire combined signal is "detected" or harvested by being converted to a DC value provided the diode(s) involved have a sufficiently high bandwidth.

The combination of $K \sin \omega_c t$ and $A(t) \sin \omega_m t$ are added and subtracted at various points in time as a function of the modulating signal and the carrier signal. Thus, for n AM radio stations (signals) in a given area, the total signal, S(t), given by:

$$s(t) = \Sigma f[K_i \sin \omega_{ci} t, A_i(t) \sin \omega_{mi} t] \text{ for } i=1, 2, \ldots, n \qquad (1)$$

is available for energy harvesting. In any given period of time, $\tau$, the total energy available to be harvested is given by:

$$\text{Energy}(\tau) = {}_0\!\int^{\tau} s(t) dt \qquad (2)$$

The resulting Energy($\tau$) may be obtained in a number of different ways:

$$\text{Energy}(\tau) = {}_0\!\int^{\tau} \{\Sigma f[K_i \sin \omega_{ci} t, A_i(t) \sin \omega_{mi} t] \text{ for } i=1, 2, \ldots, n\} dt \qquad (3)$$

In (3), the energy is assumed to be from a single antenna/detector/charge pump combination where the antenna is assumed to have a wide enough bandwidth to have equal gain across all frequencies from 1 to n. The design of such an antenna is most difficult with this restriction on gain. Thus, the more accurate version of the energy actually harvested is given by $$\text{Energy}(\tau) = {}_0\!\int^{\tau} \{g_i \Sigma f[K_i \sin \omega_{ci} t, A_i(t) \sin \omega_{mi} t] \text{ for } i=1, 2, \ldots, n\} dt \qquad (4)$$

where $g_i$ is the gain of the single antenna at that particular frequency.

The variation of gain across the entire spectrum of interest can be overcome by m multiple antennae where $$\text{Energy}(\tau) = \Sigma \{{}_0\!\int^{\tau} \{g_{i,j} \Sigma f[K_i \sin \omega_{ci} t, A_i(t) \sin \omega_{mi} t] \text{ for } i=1 \text{ to } n; j=1 \text{ to } m\} dt \qquad (5)$$

where $g_{i,j}$ is the gain of antenna j at the frequency i, for j=1, 2, \ldots, m.

Due to the nature of the modulated AM waveform, it is possible to simplify (4) to the following equation for energy $$\text{Energy}(\tau) = \Sigma \{{}_0\!\int^{\tau} \{\Sigma g_{i,j} f[A_i(t) \sin \omega_{ci} t] \text{ for } i=1 \text{ to } n; j=1 \text{ to } m\} dt \qquad (6)$$

where $A_i(t)$ is simply the modulated carrier for station or frequency i.

There are multiple embodiments of the summation over the j antennae where (a) the RF energy is combined in some device such a balun or combiner and then converted to DC or (b) the energy from each of the individual antennae is converted to DC and then added as DC sources in series [1].

Of the two cited alternatives, (b) is preferred as in (a) the time varying signals may actually subtract thus reducing the total amount of energy. With (a), they may in fact add, but that condition is encompassed within (b).

While the multiple antennae of (b) may be desirable, there is some question as to how the number m can be reduced to practice in certain applications where space is at a premium. One area of evaluation is the mutual interference of multiple antennae occupying proximate spaces. For the purpose of this issue, there are three types of areas associated with an antenna or combination of antennae:

(A) The physical area of the conductor making up the antenna(e);

(B) The geographic area required to form the antenna(e) of (A); and (C) The effective area of the antenna in terms of energy harvesting ability.

For the current evaluation, the focus will be on area (B) above, the geographic area which is sometimes referred to as the real estate in integrated circuit design. In space limited applications, a primary question is what real estate is available? In many applications, the use of energy harvesting may be contingent on getting an antenna(e) to work in a given area or real estate. If two or more antennae can be located in the same real estate, they will be said to be collocated in the current discussion. This may mean the difference in making the application work or not.

The formulation of (6) can be written in a much more concise form for the design of the set or system of antennae described. The various $g_{ij}$ can be written in matrix form G where the rows indicate the various antennae having gains $g_{i,j}$; j=1, 2, . . . , n for individual harvesting at each frequency and the columns represent the energy harvested by the antennae; i=1, 2, . . . , m.

$$\text{Energy } (t) = \underline{c}'(t) * \underline{G} * \underline{a}(t) \quad (7)$$

In (7), a(t) is the column vector composed of the various AM radio signals available in a particular location. The row vector, $\underline{c}'(t)$, is the vector of combination (RF combination or series DC connection) that identifies which antennae are present in any given configuration of antennae occupying the same real estate. As a result, $\underline{c}'(t)$, is a vector of 1's (antenna present) and 0's (antenna not present). Based on the formulation of (7), it is possible to switch antennae in and out of the available configuration.

If no antenna switching is to be used, (7) reduces to the form of (8) due to the constant set of antennae.

$$\text{Energy } (t) = \underline{c}' * \underline{G} * \underline{a}(t) \quad (8)$$

Although each AM station signal is modulated, it is possible to approximate each signal $a_i(t)$ by an average value $_i$, over some reasonable interval of time. Thus, (8) can be further reduced to the form of (9).

$$\text{Energy } (t) = \text{Energy} = c' * G * \alpha \quad (9)$$

As the FCC fixes the frequencies of transmission, if one assumes α is a vector of all FCC authorized AM radio stations, say M stations, and the set of antennae possible is covered in the vector $\underline{c}'$ having dimension M, then the energy harvested across an entire geographic region can be formulated as $$\text{Energy } (x, y) = \underline{c}' * \underline{G} * \underline{\alpha}(x,y) \quad (10)$$

for any geographic position with coordinates (x,y). If one is designing a particular product for energy harvesting that is to be used throughout a large geographic region, the elements present in $\underline{c}'$ and the gains of $\underline{G}$ may be varied to achieve an optimum device in terms of both performance and cost.

Alternatively, the device (product) may be designed to contain a fixed number of elements for $\underline{c}'$ by allowing frequency overlap from antenna to antenna and controlling elements to alternatively select from a fixed number of alternatives.

Energy Harvesting Circuit

In one embodiment of the invention, an energy harvesting circuit has a means for receipt of ambient energy from the environment and energizing power storage devices of objects of interest. The energy harvesting circuit comprises one or more antennae and circuitry for converting said ambient energy into DC power for energizing said power storage devices. The antenna of said station is tuned to produce the maximum DC energy at the output of the rectifier/charge pump. The station can be used to energize power storage devices including capacitors and batteries that are used in electronic devices such as cell phones, cameras, PDAs, for example.

The antenna is tuned to produce the maximum DC energy at the output of the rectifier/charge pump. The antenna can be an antenna array consisting of multiple broadband antennae each tuned to a different portion of the frequency spectrum in order to harvest RF energy from a broad RF spectrum. Alternately, the antenna can be an antenna array consisting of multiple broadband antennae in the same space each tuned to a specific portion of the frequency spectrum in order to maximize the harvest RF energy from an RF spectrum in same physical space. The circuitry for converting said ambient energy into DC power may include a rectifier/charge pump. An RF combiner or balun can be used to combine the input signals from two or more antennae directed to the rectifying circuit.

In one preferred embodiment of this invention a station having a means for receipt of ambient energy from the environment and energizing power storage devices of objects of interest comprising:

i. one or more antennae; and ii. circuitry for converting said ambient energy into DC power for energizing said power storage devices;

wherein said circuitry for converting said ambient energy into DC power includes a rectifier/charge pump; and wherein said antenna is tuned to produce the maximum DC energy at the output of the rectifier/charge pump.

A preferred antenna is an antenna array consisting of multiple broadband antennae. Each broadband antenna in the array can be tuned to the same portion of frequency spectrum or a different portion of the frequency spectrum in order to harvest RF energy from a broad RF spectrum. In this embodiment, each antenna in the array is wideband antenna that is tuned so as to cover a large portion of the frequency spectrum. The circuitry for converting said ambient energy into DC power includes a rectifier/charge pump. An RF combiner can be used to combine ambient energy harvested from said antennae prior to be the circuitry for converting said transmitted energy to DC power.

This invention overcomes the problem disclosed in the prior art using dipoles that are fixed to absorb RF energy at a specific frequency. Multiple broadband antennae tuned so as to function over a very wide range of frequencies would effectively harvest energy from ambient RF. The use of multiple broadband antennae of this invention would minimize the problems associated with a resonant antenna or antennae that need to be manually or electronically tune to harvest the RF energy efficiently.

In another preferred embodiment, a remote station having a means for receipt of ambient energy from the environment and energizing power storage devices of objects of interest comprising:

i. two or more antennae;

ii. an RF combiner; and iii. circuitry for converting said ambient energy into DC power for energizing said power storage devices.

Each antenna is a wideband antenna that is tuned so as to cover a large portion of the frequency spectrum. An RF combiner is used to combine ambient energy harvested from said antennae prior to be the circuitry for converting said transmitted energy to DC power.

Antenna

The antenna for efficient energy harvesting may have characteristics that are different from those of a communications antenna. The antenna types and forms covered in this disclosure include:
1. A classical antenna in the sense of communications to be used as a transmitting or receiving antenna such as a monopole, a dipole, bow-tie or loop antenna;
2. An antenna array wherein each antenna in the array is substantially the same from antenna to antenna.
3. An antenna array wherein each antenna in that array is tuned to a particular frequency or range of frequencies in the RF spectrum.

The antenna of this invention is tuned to produce the maximum DC energy at the output of the rectifier/charge pump. A station includes circuitry for converting said ambient energy into DC power for energizing said power storage devices. In the case of a classical antenna, the circuitry may include the antenna being connected to a classical tuning element or to a tuning element specifically designed for energy harvesting.

In the case of an antenna array, wherein each antenna in the array is the same from antenna to antenna, the electrical collection of antennae inputs may be connected to a classical tuning element or to a tuning element specifically designed for energy harvesting. In this case, the DC outputs can be combined to obtain a higher voltage as when the DC output would be connected in series. The situation here is one depicted as a relatively narrow band of frequencies being harvested with the outputs connected in series. Likewise, an RF combiner or balun can be used to combine the input signals from two or more antennae in the antenna array directed to the rectifying circuit. It is believed that the use of RF combiner(s) could provide a means to increase the energy harvesting capability of the energy harvesting circuit using multiple antennae (broadband or tuned) without the need for rectifying circuits for each discrete antenna.

Finally, in the case of an antenna array, wherein each antenna in that array is tuned to a particular frequency in the RF spectrum, the DC outputs of each antenna can combine in series to obtain a higher voltage. Likewise, an RF combiner or balun can be used to combine the input signals from two or more of the antennae in the antenna array directed to the rectifying circuit. As stated above, it is believed that the use of RF combiner(s) could provide a means to increase the energy harvesting capability of the energy harvesting circuit using multiple antennae (broadband or tuned) without the need for rectifying circuits for each discreet antenna In terms of tuning, the antenna of may be designed according to traditional/classical methods of a conductor. This is especially true if the station of this invention includes monopole, dipole, bow tie, loop or other standard type of antenna, If the antenna is planar and is produced on a substrate, the metal (conductor) thickness of each or any combination of antennae may vary in thickness so as to aid in the tuning of the antenna or antenna/connection mechanism to a specific frequency or range of frequencies. Another embodiment of this invention is where the antenna(e) can be tuned by means of capacitors that are controlled by electronic switches. Likewise, the antenna(e) can be tuned by means of capacitors where the capacitors are formed as solid state (CMOS) devices or as transistors specifically formed to function as capacitors.

Figure 1:
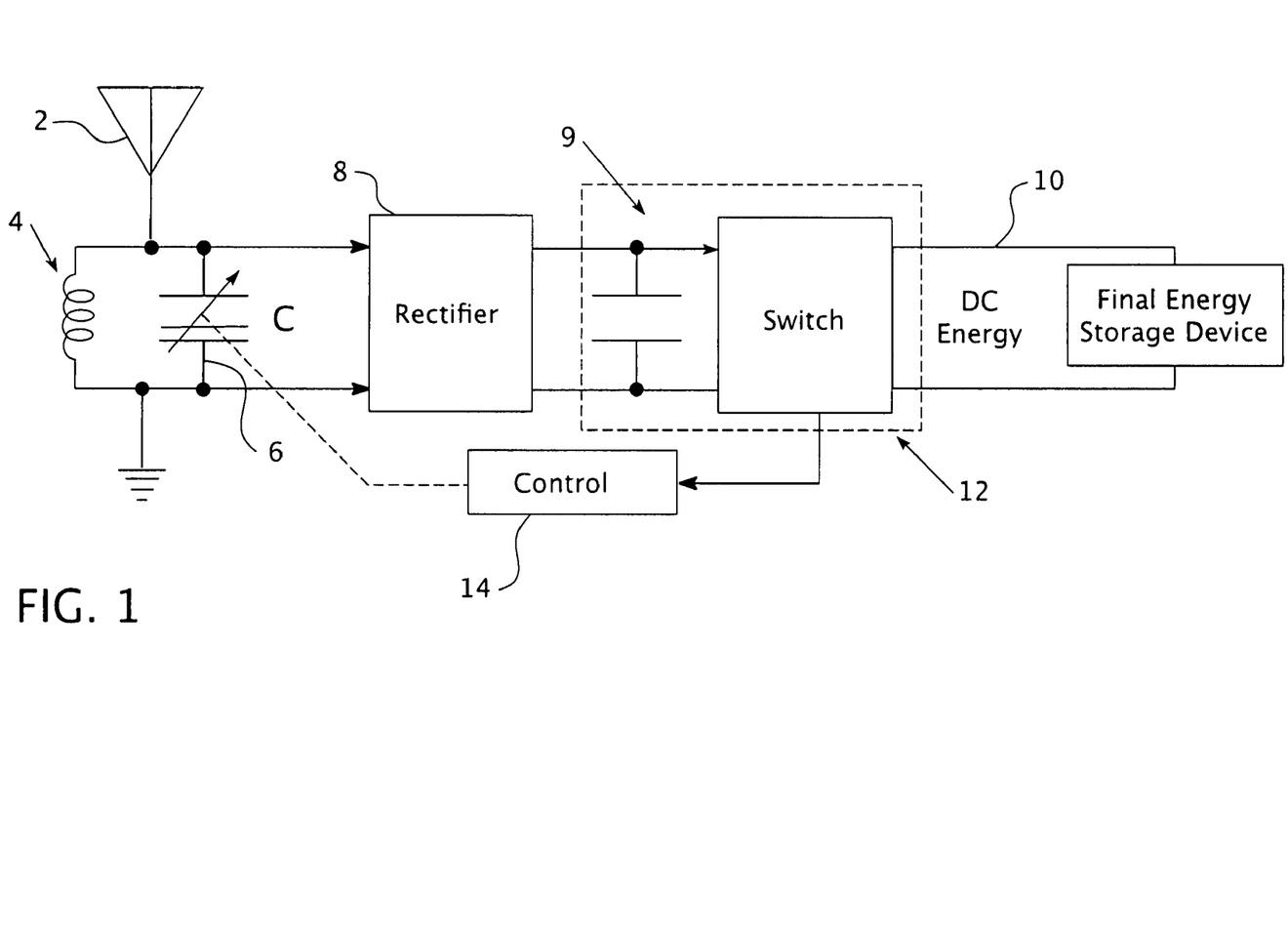
FIG. 1 is a schematic illustration of one embodiment of energy harvesting circuit of the present invention that includes a tuning/control system for energy harvesting.

FIG. 1 illustrates schematically energy harvesting circuitry including a tuning/control system for converting harvested energy received by antenna 2 into output DC energy 10.

The L, C elements 4, 6 form a type of tuning circuit so as to maximize the harvested DC energy 10.

The rectifier 8 may be any circuit that converts the RF or AC energy received from the antenna 2 into DC energy to be stored on the intermediate storage capacitor 9 or other device. This may include a charge pump or other rectifying/enhancing device.

The switch 12 may be an electronic mechanism to interface between the final energy storage device connected to the DC energy output 10 and the intermediate device 9. The switch 12 thus forms an optimum energy transfer so as to provide a small enough capacitor as the intermediate energy device 9 to satisfactorily operate electronic devices at fixed time intervals while also storing any additional unused energy on a much larger device where a given voltage may not be present when needed. The switch 12 also functions as a part of an interval timing device to provide an input to the control circuitry 14 so as to adjust the tuner for maximum energy harvesting.

EXAMPLE

Figure 5:
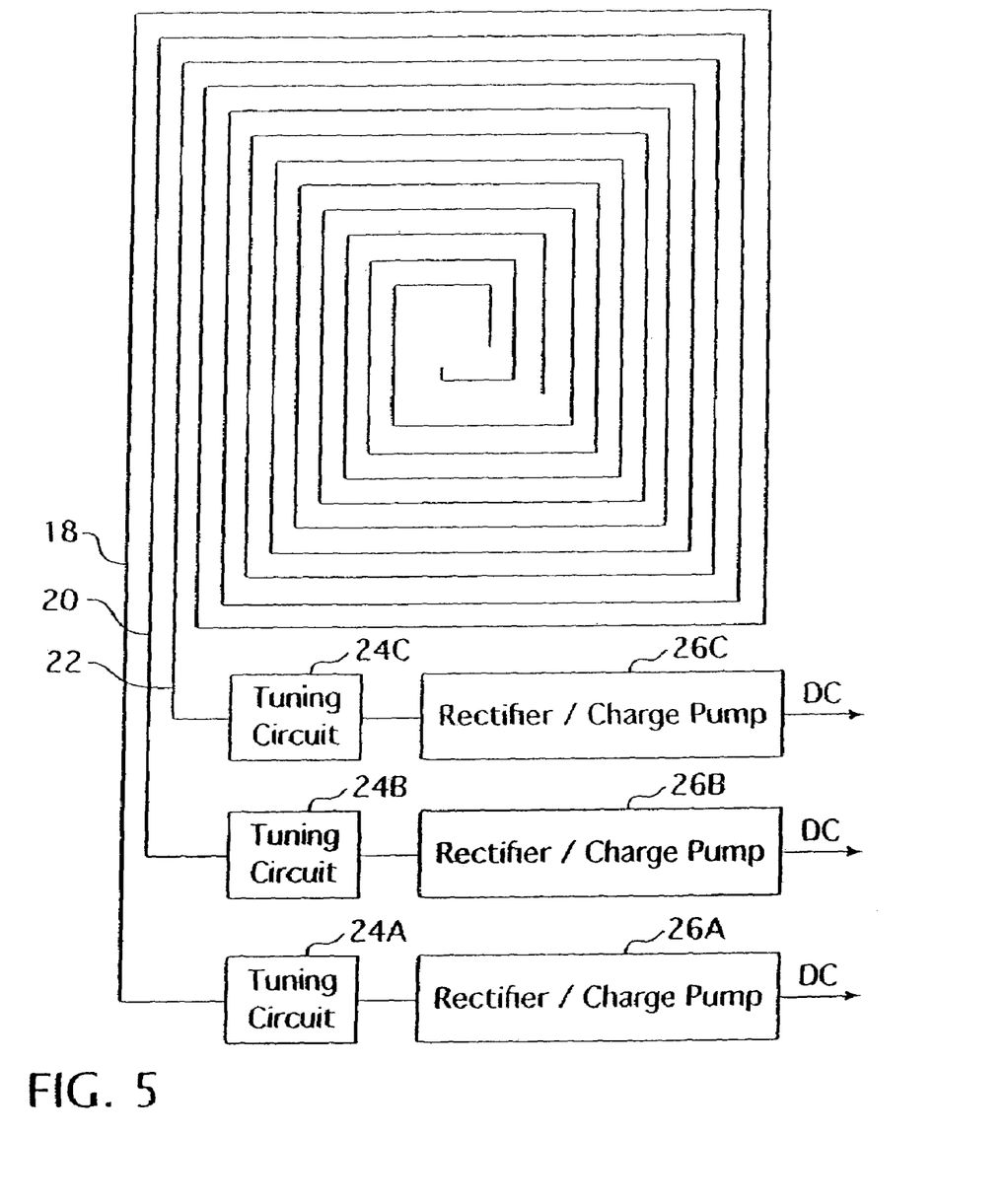
FIG. 5 is a schematic illustration of another embodiment of an apparatus according to the present invention showing a three antenna configuration having multiple tuning circuits and rectifiers/charge pumps.
Figure 6:
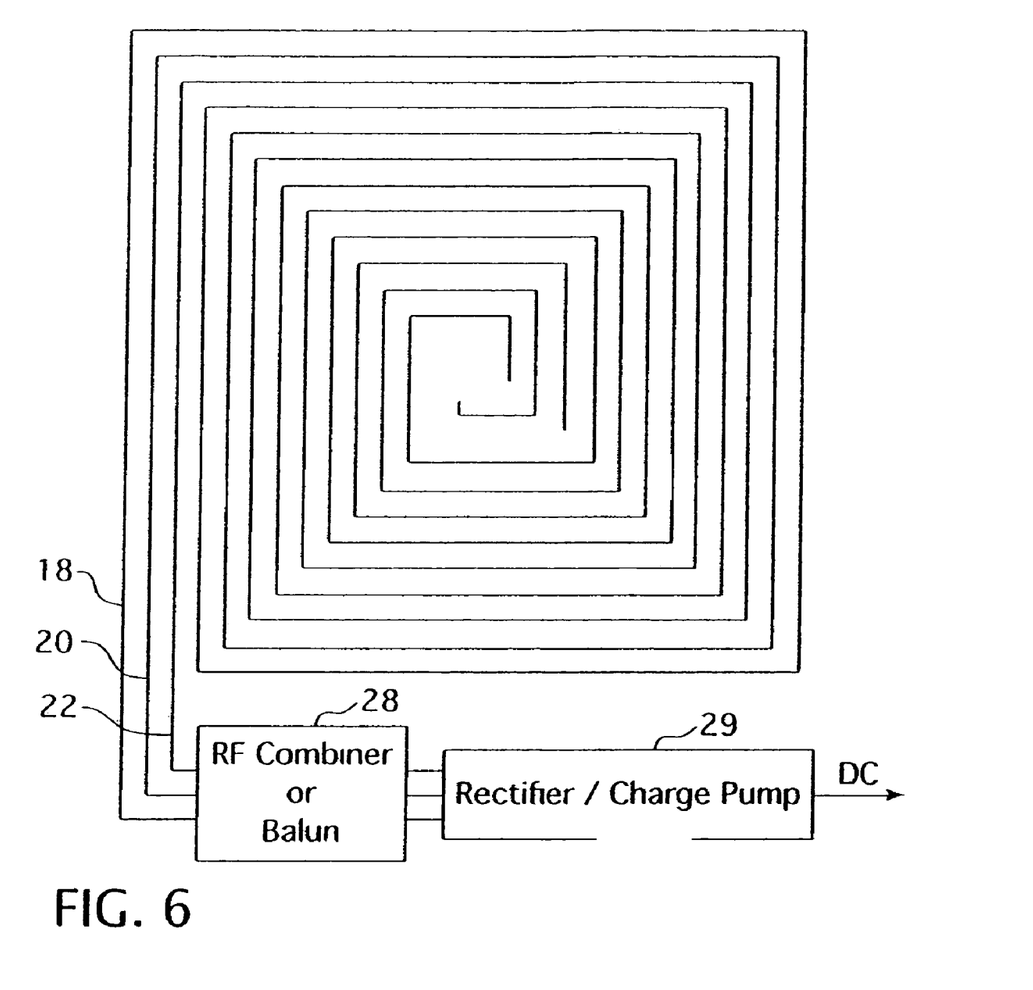
FIG. 6 is a schematic illustration of another embodiment of an apparatus according to the present invention showing a three antenna configuration having an RF combiner or balun and a rectifier/charge pump.

Multiple antennae are advantageous in situations of low ambient energy where multiple harvesting circuits can be connected in series in order to increase the DC voltage resulting from the harvested, energy. The three antennae 18, 20, 22 of the embodiment of FIG. 2 can be easily connected to the rectifying circuitry from the connection points. FIG. 5 shows a tuning circuit 24A. 24B, 24C and a rectifier/charge pump 26A, 26B, 26C connected to each of the three antennae 18, 20, 22 as described elsewhere herein. FIG. 6 shows each of the three antennae 18, 20, 22 connected to an RF combiner or balun 28 and a rectifier/charge pump 29 as described elsewhere herein. Other configurations are possible, however, the connection point should preferably be at the outside of the rectangular configuration. This is a line feed mechanism. Connecting at the center (probe feed) has been shown to be a poor choice for maximum energy harvesting.

Figure 2:
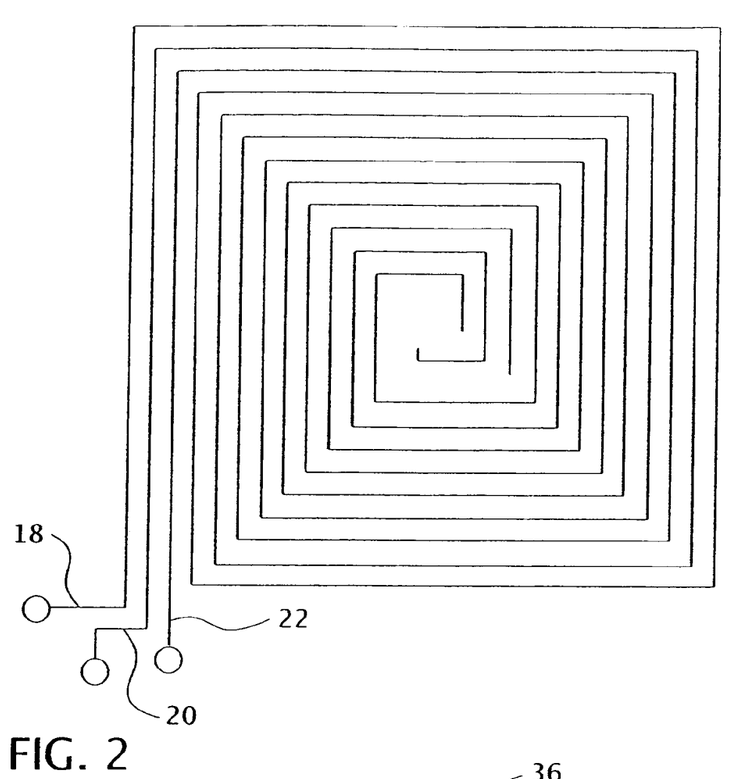
FIG. 2 is a schematic illustration of one embodiment of the antenna of this invention showing a three antenna configuration.

In addition, it is desirable to design the multiple said antennae such that they do not interfere with each other when performing said antenna function. Also, said first antenna 18 may provide distributed L, C parameters for said second antenna 22 design. The first and second antennae 18, 22 also possess spaces separating one antenna from the other as well as the sections of their own antenna formation. Thus, a third antenna 20 may be placed in the spacing between said first antenna and said second antenna. The first and second distributed L, C parameters may aid in the design of the third antenna.

Figure 3:
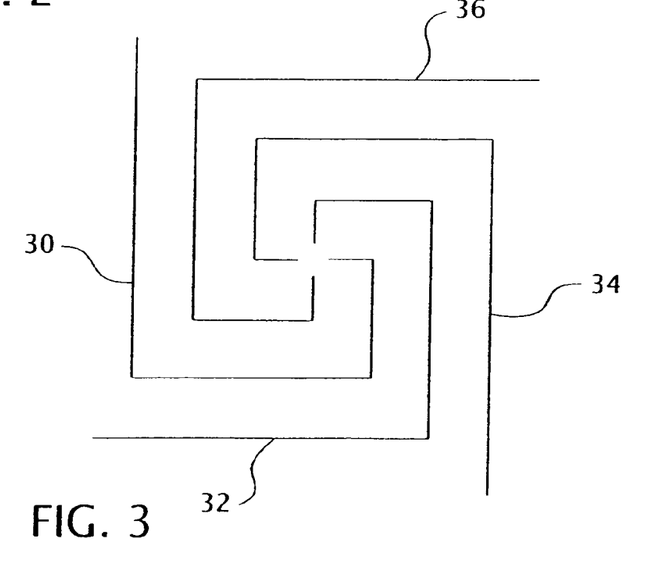
FIG. 3 is a schematic illustration of one embodiment of the antenna of this invention showing a four antenna configuration.

FIG. 3 illustrates a group of four antennae 30, 32, 34, 36 in one connection arrangement.

FIGS. 4(a)–4(f) illustrate the operation of two spiral antennae within a single area. Two sets have been tested. The first antenna uses 695 MHz and 755 MHz, and the second antenna uses 510 MHz and 725 MHz. In these test cases, it was desirable to use two different frequencies in order to simply observe the results. However, the closeness of the frequencies (especially in the case of 695, 755) is such that two essentially equal or even identical frequencies will also function in a similar and proper manner.

FIGS. 2 and 3 represent two of many possible alternative layouts of monopole antennae that occupy the same geographic space thus enabling a multiplicity of antennae to harvest energy in the same geographic area. This area may be expanded or contracted so as to optimize the device based on area available and energy requirements.

FIGS. 4(a)–4(d) illustrate the main binary combinations of two antennae functioning and not functioning in the same geographic area. These four illustrations taken from a spectrum analyzer demonstrate that either or both antennae that are physically fabricated in the same geographic area suffer no negative effects as the result of both functioning simultaneously. To note the power levels for the combined functioning antennae, FIGS. 4(a) and 4(c) indicate the power level markers to be compared with the two singually functioning antennae.

The tests were constructed to show that the two antennae would function while being connected with little difference in OFF/ON conditions. The markers indicate the individual power levels as in the case of only 755 MHz functioning FIGS. 4(b)–4(b), there is a power level of −57.92 dBm. With both 695 MHz and 755 MHz functioning FIG. 4(a), the 755 MHz has a power level of −57.94 dBm. The 510 MHz and 725 MHz single results FIGS. 4(e) and 4(f), respectively, are included, but the antennae (both the same) were just a little too far off the 700 MHz range at 510 MHz with a reduced signal level.

Figure 4A:
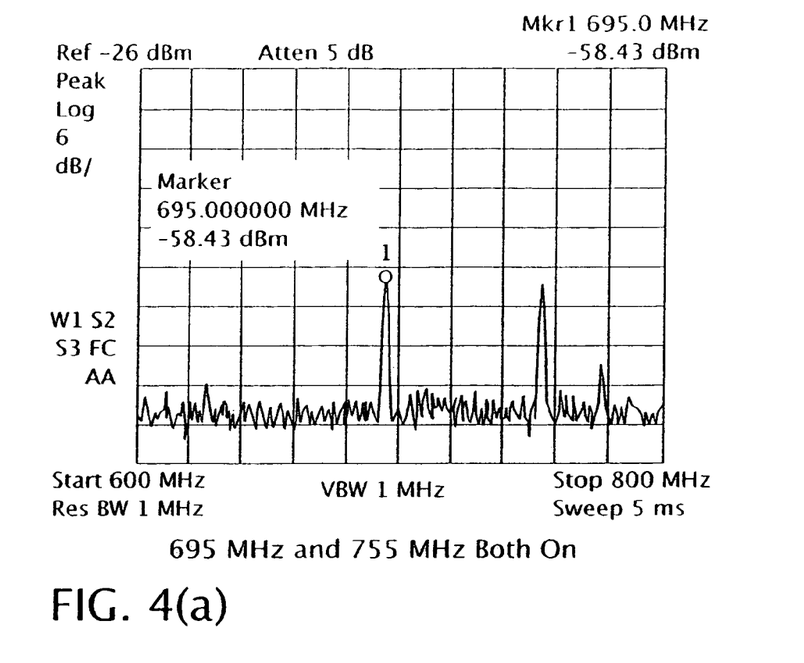
Figure 4B:
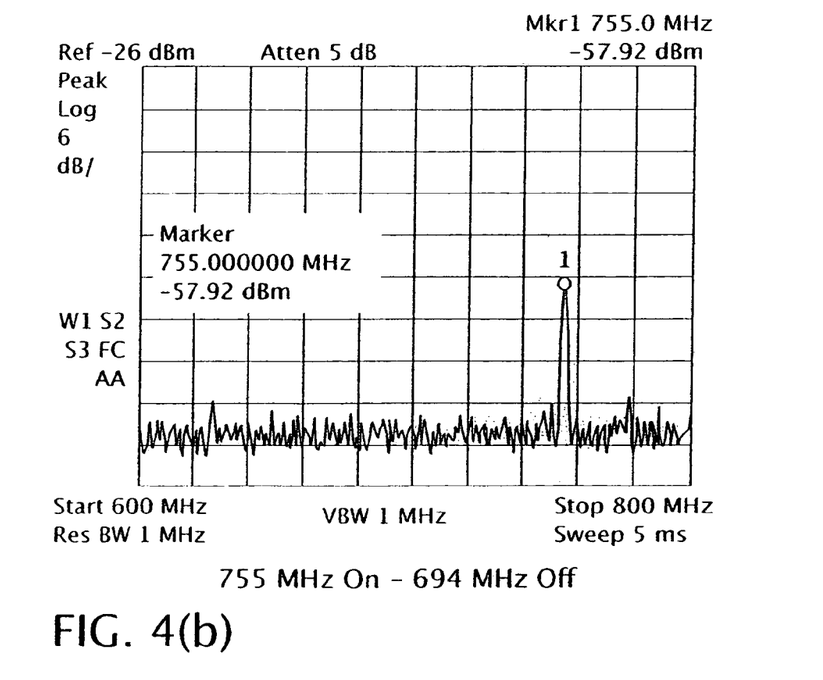
Figure 4C:
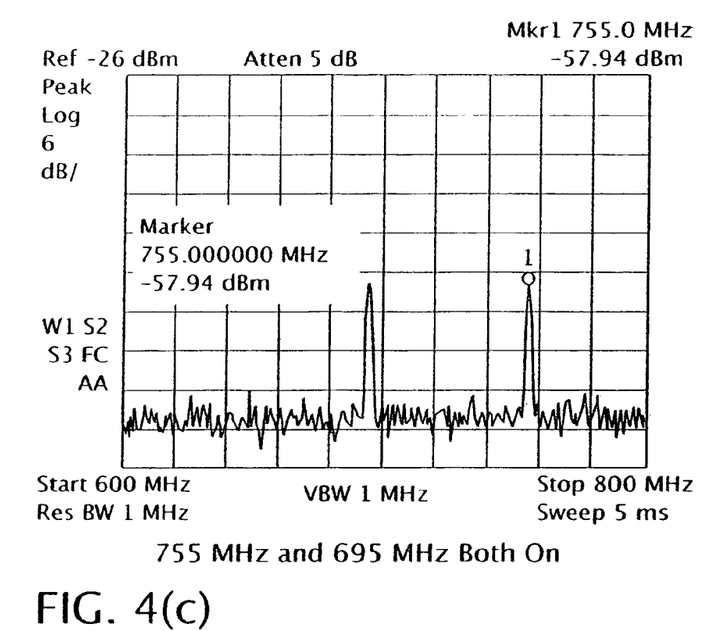
Figure 4D:
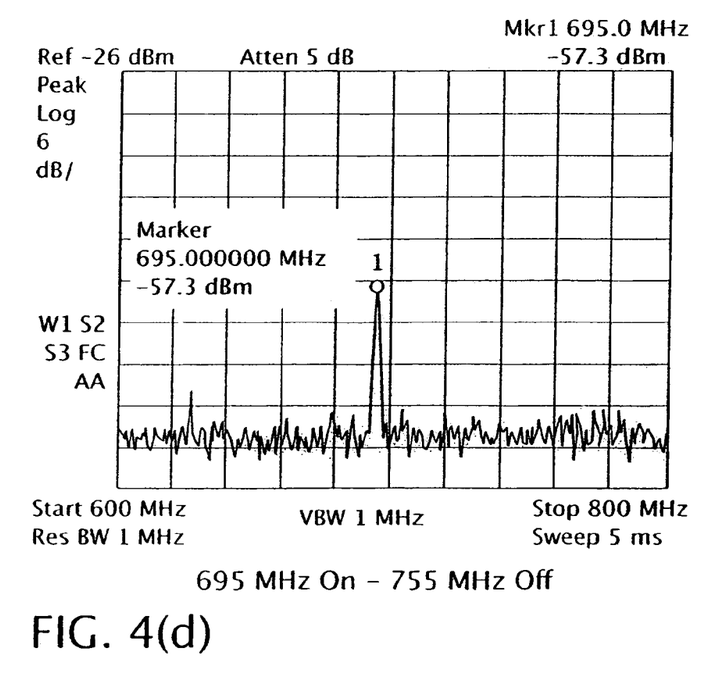
Figure 4E:
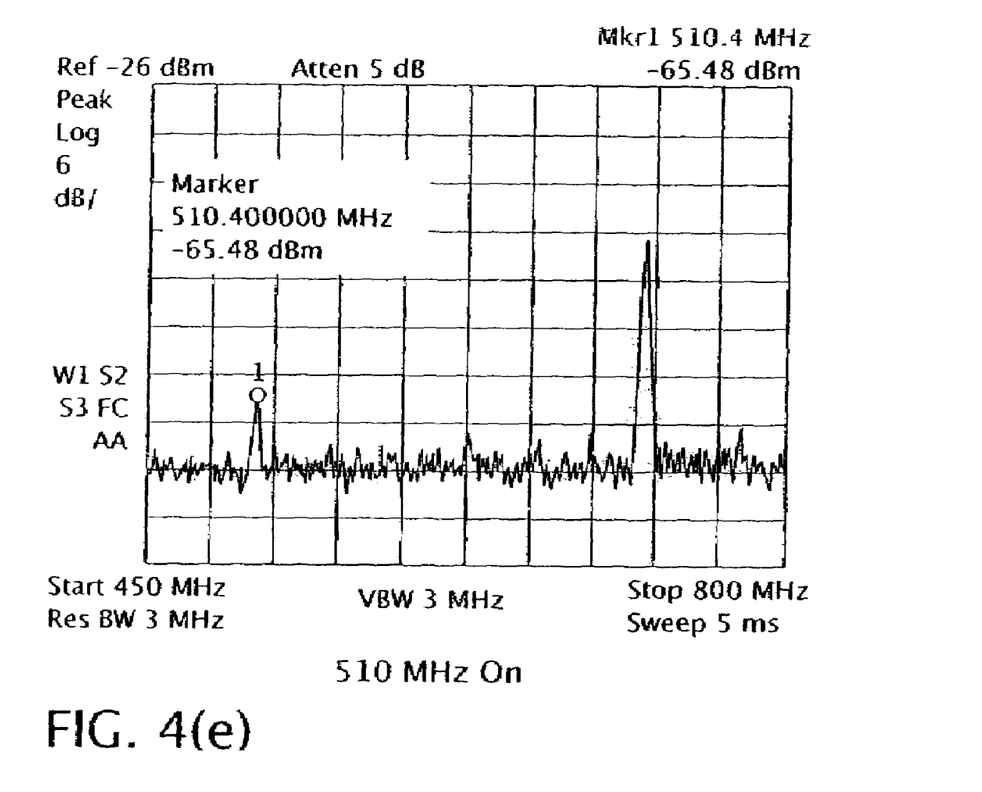

FIGS. 4(e) and 4(f) show the markers for the two alternative frequencies.

However, this difference strengthens the equal frequencies being satisfactory as can be seen from 695 MHz giving −58.43 dBm and 755 MHz giving −57.94 dBm when both antennae are functioning.

Whereas particular embodiments have been described hereinabove, for purposes of illustration, it will be evident to those skilled in the art that numerous variations of the details may be made without departing from the invention as defined in the appended claims.

The invention claimed is:

1. A remote station for receiving ambient energy from the environment and energizing one or more power storage devices of an object of interest comprising:
    one or more antennae, each of said antennae harvesting RF energy from said ambient energy,
    one or more conversion circuits, each of said conversion circuits generating a DC signal for energizing said one or more power storage devices by converting the RF energy harvested by a respective one of said one or more antennae into DC energy, and
    one or more tuning circuits, each of said tuning circuits being electrically connected to a respective one of said one or more antennae to tune said respective one of said one or more antennae in order to maximize the DC signal generated from the RF energy harvested by said respective one of said one or more antennae.

2. The remote station of claim 1 wherein said one or more antennae is a plurality of antennae, wherein said one or more conversion circuits is a plurality of conversion circuits, and wherein said one or more tuning circuits is a plurality of tuning circuits.

3. The remote station of claim 2 wherein each of the DC signals generated by said conversion circuits are combined in series to obtain a higher voltage.

4. The remote station of claim 2 wherein each of said tuning circuits comprises an LC circuit.

5. The remote station of claim 2 wherein each of said antennae is tuned to a different frequency so as to harvest energy from a broadband RF spectrum, said RF energy harvested by each one of said antennae being of the frequency to which said one of said antennae is tuned.

6. The remote station of claim 2 wherein each of said antennae is a broadband antennae tuned to a different frequency spectrum so as to harvest energy from a broadband RF spectrum, said RF energy harvested by each one of said antennae being of the frequency spectrum to which said one of said antennae is tuned.

7. The remote station of claim 2 wherein said ambient energy comprises a frequency spectrum and wherein each of said antennae is tuned to the same frequency or portion of the frequency spectrum.

8. The remote station of claim 1 wherein the ambient energy is RF power.

9. The remote station of claim 2 wherein each of said antennae is a wideband antenna for substantially continuous coverage of about 20 KHz to 30 MHz radio frequency spectrum.

10. The remote station of claim 2 wherein each of said antennae is a wideband antenna for continuous coverage of about 1.5 MHz to 30 MHz radio frequency spectrum.

11. The remote station of claim 2 wherein each of said antennae is a wideband antenna for continuous coverage of about 30 MHz to 3 GHz radio frequency spectrum.

12. The remote station of claim 2 wherein each of said antennae generally occupy a fixed geographic area.

13. The remote station of claim 12 wherein each said fixed geographic area is included within a certain fixed area.

14. The remote station of claim 2 wherein each of said conversion circuits includes a rectifier/charge pump.

15. A remote station for receipt of ambient energy from the environment and energizing one or more power storage devices of an object of interest comprising
    at least two antennae, each of said antennae harvesting RF energy from said ambient energy,
    an RF combining device electrically connected to each of said antennae, said RF combining device generating a combined RF signal from the RF energy harvested by each of said antennae, and
    circuitry for converting said combined RF signal into DC power for energizing said one or more power storage devices,
    wherein said RF combining device tunes a combination of said antennae in a manner that maximizes said DC power.

16. The remote station of claim 15 wherein said RF combining device comprises an RF combiner.

17. The remote station of claim 15 wherein said RF combining device comprises a balun.

18. The remote station of claim 15 wherein each of said antennae is tuned to a different frequency so as to harvest energy from a broadband RF spectrum.

19. The remote station of claim 15 wherein each of said antennae is a broadband antennae tuned to a different frequency spectrum so as to harvest energy from a broadband RF spectrum.

20. The remote station of claim 15 wherein said ambient energy comprises a frequency spectrum and wherein each of said antennae is tuned to the same frequency or portion of the frequency spectrum.

21. A remote station for receiving ambient energy from the environment and providing energy to objects of interest comprising
    at least one antenna,
    circuitry for converting said ambient energy into DC power,
    at least two power storage devices, a first one of said power storage devices being electrically connected to said circuitry, and a switch for selectively electrically connecting said first one of said power storage devices to a second one of said power storage devices.

22. The remote station of claim 21 wherein said first and second ones of said power storage devices have different charging dynamics.

23. The remote station of claim 22 wherein said power storage devices are capacitors.

24. A remote station for receiving ambient energy from the environment and energizing one or more power storage devices of an object of interest comprising at least one antenna, circuitry for converting said ambient energy into DC power for energizing said one or more power storage devices, a tuning mechanism electrically connected to said at least one antenna and said circuitry, and a feedback device for providing feedback to the tuning mechanism to adjust the tuning mechanism for a higher level of energy harvesting.

* * * * *

UNITED STATES PATENT AND TRADEMARK OFFICE
CERTIFICATE OF CORRECTION

| | | |
|---|---|---|
| PATENT NO. | : 7,084,605 B2 | Page 1 of 1 |
| APPLICATION NO. | : 10/967833 | |
| DATED | : August 1, 2006 | |
| INVENTOR(S) | : Marlin H. Mickle, Christopher C. Capelli and Harold Swift | |

It is certified that error appears in the above-identified patent and that said Letters Patent is hereby corrected as shown below:

Column 3, lines 52-53, the word "antennae" should be italicized --*antennae*--.

Column 3, line 66, the word "detected" should be italicized --*detected*--.

Column 4, line 1, the words "detected" and "harvested" should be italicized --*detected*-- and --*harvested*--.

Column 4, line 5, the word "and" should be underlined --and--

Column 5, lines 3, 4, 7 and 8 (four instances), the words "real estate" should be italicized --*real estate*--.

Column 5, line 20, "a(t)" should be changed to --a(t)--.

Column 5, line 25, the words "real estate" should be italicized --*real estate*--.

Column 5, Formula 9 (line 38), "Energy $(t)$=Energy=$c'*G*\alpha$" should be changed to --Energy $(t)$=Energy=$c'*\underline{G}*\underline{\alpha}$--.

Column 8, line 26, delete the "," after "harvested".

Signed and Sealed this

Twentieth Day of March, 2007

JON W. DUDAS
*Director of the United States Patent and Trademark Office*

UNITED STATES PATENT AND TRADEMARK OFFICE
CERTIFICATE OF CORRECTION

PATENT NO. : 7,084,605 B2 Page 1 of 1
APPLICATION NO. : 10/967833
DATED : August 1, 2006
INVENTOR(S) : Marlin H. Mickle, Christopher C. Capelli and Harold Swift It is certified that error appears in the above-identified patent and that said Letters Patent is hereby corrected as shown below:

Column 9, line 15, "FIGS. 4(*b*)–4(*b*)" should read --FIGS. 4(*a*)–4(*b*)--.

Signed and Sealed this

Twelfth Day of June, 2007

JON W. DUDAS
*Director of the United States Patent and Trademark Office*